United States Patent
Niemeyer (10) Patent No.: US 8,966,247 B2
(45) Date of Patent: Feb. 24, 2015

(54) MANAGING SECURITY CERTIFICATES OF STORAGE DEVICES

(75) Inventor: Terry W. Niemeyer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 13/540,658

(22) Filed: Jul. 3, 2012

(65) Prior Publication Data

US 2014/0013105 A1    Jan. 9, 2014

(51) Int. Cl.
    *H04L 29/06*     (2006.01)
    *G06F 21/33*     (2013.01)
    *G06F 21/44*     (2013.01)

(52) U.S. Cl.
    CPC ............... *G06F 21/33* (2013.01); *G06F 21/44* (2013.01)
    USPC .......................................................... 713/156

(58) Field of Classification Search
    CPC ... G06F 21/33; G06F 21/44; H04L 29/06775; H04L 63/0823; H04L 9/3263
    USPC .......................................................... 713/156
    See application file for complete search history.

(56) References Cited

U.S. PATENT DOCUMENTS

| | | | |
|---|---|---|---|
| 6,421,781 B1 * | 7/2002 | Fox et al. ........................... | 726/4 |
| 7,512,974 B2 * | 3/2009 | Callaghan et al. .............. | 726/14 |
| 8,578,467 B2 * | 11/2013 | Ronda et al. .................... | 726/10 |
| 2002/0116611 A1 * | 8/2002 | Zhou et al. ..................... | 713/156 |
| 2006/0143442 A1 | 6/2006 | Smith | |
| 2008/0010448 A1 * | 1/2008 | Sabnis et al. ................... | 713/156 |
| 2008/0086634 A1 * | 4/2008 | Salowey et al. ............... | 713/156 |
| 2009/0070582 A1 * | 3/2009 | Aura et al. ..................... | 713/168 |
| 2009/0132812 A1 * | 5/2009 | Kobozev et al. .............. | 713/156 |
| 2009/0235067 A1 | 9/2009 | Miller et al. | |
| 2010/0083347 A1 * | 4/2010 | Hinton .............................. | 726/1 |
| 2010/0205429 A1 * | 8/2010 | Alrabady et al. ............. | 713/156 |
| 2010/0325418 A1 | 12/2010 | Kanekar | |
| 2011/0161661 A1 * | 6/2011 | Medvinsky et al. .......... | 713/156 |
| 2011/0264905 A1 | 10/2011 | Ovsiannikov | |
| 2013/0185552 A1 * | 7/2013 | Steer ............................. | 713/156 |

\* cited by examiner

*Primary Examiner* — Matthew Smithers
*Assistant Examiner* — Jing Sims
(74) *Attorney, Agent, or Firm* — Yee & Associates, P.C.; Parashos T. Kalaitzis (57) ABSTRACT

A method and data processing system for managing security certificates in a data processing environment is disclosed. A computer identifies a security certificate associated with a management interface of a device in the data processing environment. The computer determines whether the security certificate was issued by a certificate authority that is trusted. In response to determining that the security certificate was not issued by the certificate authority, the computer identifies the security certificate as invalid. Subsequent to identifying the security certificate as invalid, the computer determines if a service exists in the data processing environment that includes a feature for sending information about critical events associated with the data processing environment. Responsive to determining that the service with the feature exists in the data processing environment, the computer generates a certificate-signing request for the management interface of the device and sends the certificate-signing request via the feature in the service.

18 Claims, 6 Drawing Sheets

MANAGING SECURITY CERTIFICATES OF STORAGE DEVICES

BACKGROUND

1. Field

The disclosure relates generally to managing security certificates and in particular, to manage security certificates of computer systems. Still more particularly, the present disclosure relates to a method, data processing system, and computer program product for using services to manage security certificates of storage devices in a data processing environment.

2. Description of the Related Art

Providers of devices, such as storage devices, often deliver applications with management interfaces for managing the devices in a data processing environment. The management interfaces of these applications may be accessed from a web browser or through some other user interface. These applications are typically installed with a default configuration that allows the management interface to be used by a user to perform a number of tasks associated with management of a device. These default configurations, however, may not be a correct configuration or even a complete configuration in view of certain security requirements of the data processing environment.

Some data processing environments are configured to present a user with a security error when an application attempts to perform a function for which the application does not have permission. For example, some data processing environments may have a rule for checking to make sure a use of an application is performed in association with a security certificate that has been issued by a certificate authority that is authenticated. In these data processing environments, a security error may result in a component in the data processing environment presenting a user with a security error message indicating that a particular security certificate has not been issued by a certificate authority that is trusted. After receiving the security error message the user must resolve the issue before the application can perform the function for which the application does not have permission. However, the user may not have the expertise to know how to resolve the security error. Further, even if the user does have the expertise, the steps to resolve the security issue may often be more labor-intensive and expensive than desired.

Currently, services applications in data processing environments are available to assist in trouble-shooting issues associated with components of a data processing environment. This type of service application can be used to get help from the manufacturer or reseller of components in the data processing environment. However, these types of service applications often require subject matter experts having skills that are unique to the issues. Additionally, the use of these services applications can often be more labor-intensive and expensive than desired.

Therefore, it would be advantageous to have a method, data processing system, and computer program product that takes into account at least some of the issues discussed above, as well as possibly other issues.

SUMMARY

In one illustrative embodiment, a method, data processing system, and computer program product for managing security certificates in a data processing environment is provided. A data processing system identifies a security certificate associated with a management interface of a device in the data processing environment. The data processing system determines whether the security certificate was issued by a certificate authority that is trusted. In response to determining that the security certificate was not issued by the certificate authority, the data processing system identifies the security certificate as invalid. Subsequent to identifying the security certificate as invalid based on the determination that the security certificate was not issued by the certificate authority that is trusted, the data processing system determines if a service exists in the data processing environment that includes a feature for sending information about critical events associated with the data processing environment. Responsive to determining that the service with the feature for sending information about critical events associated with the data processing environment exists in the data processing environment, the data processing system then generates a certificate-signing request for the management interface of the device and sends the certificate-signing request via the feature in the service.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
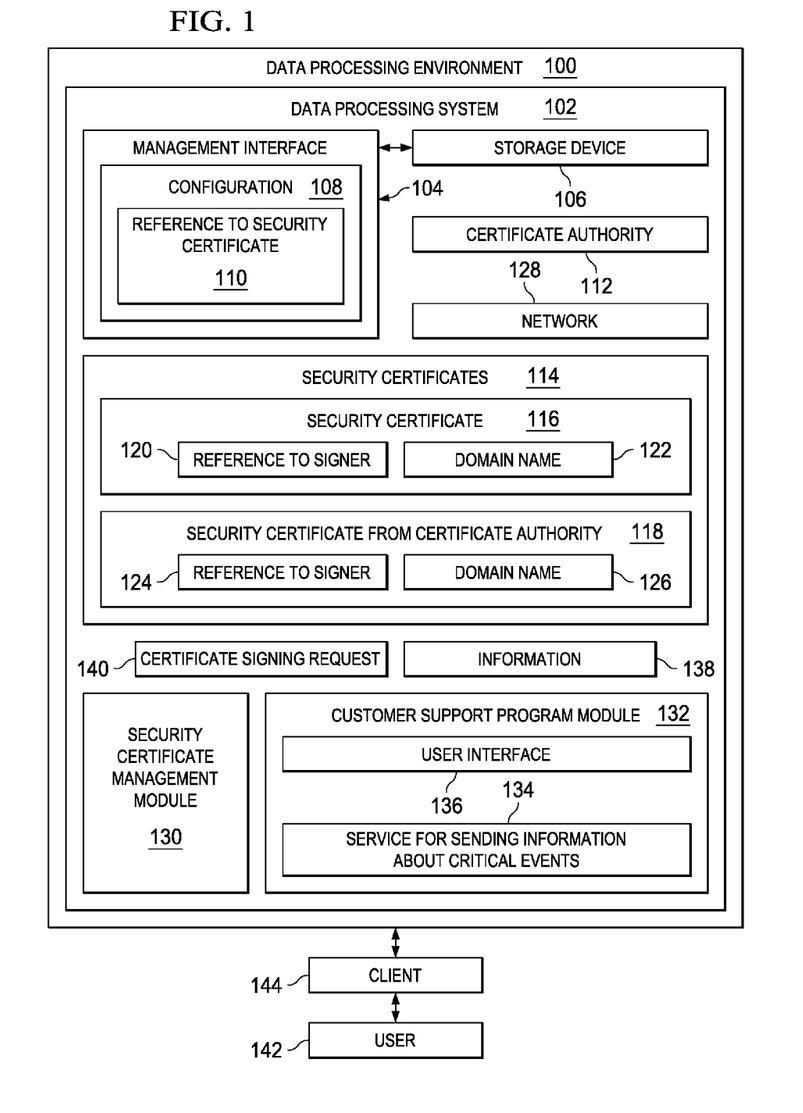
FIG. 1 is a block diagram of components involved in managing security certificates in a data processing environment in accordance with an illustrative embodiment.

With reference now to the figures and, in particular, with reference to FIG. 1, an illustration of components involved in managing security certificates in a data processing environment is depicted in block form in accordance with an illustrative embodiment. In this illustrative example, data processing system 102 is present in data processing environment 100. Data processing system 102 may comprise a set of computers. A "set," as used herein with reference to items, means one or more items. For example, "set of computers" is one or more computers. When more than one computer is present in data processing system 102, those computers may be in communication with each other. This communication may be facilitated through a medium such as a network. This network may be, for example, without limitation, a local area network, a wide area network, an intranet, the internet, and some other suitable type of network.

In these illustrative examples, management interface 104 is located in data processing environment 100. Management interface 104 may comprise hardware, software, or a combination of the two for managing devices, such as storage device 106. In these illustrative examples, management interface includes configuration 108 for storage device 106. Configuration 108 for storage device 106 comprises information required to authenticate management interface 104 for use in data processing environment 100. In particular, configuration 108 for storage device 106 includes reference to security certificate 110 for identifying the location of a security certificate for authenticating a use of data processing system 102 in data processing environment 100.

Certificate authority 112 is present in data processing system 102 in this illustrative example. In these illustrative examples, certificate authority 112 may comprise hardware, software, or a combination of the two for signing security certificates 114. As depicted, security certificates 114 include security certificate 116 and security certificate from certificate authority 118. In these illustrative examples, security certificate 114 is identified by reference to security certificate 110 for authenticating use of data processing system 102 in data processing environment 100 by management interface 104. In these illustrative examples, security certificate from certificate authority 118 may also be identified by reference to security certificate 110 for authenticating use of data processing system 102 in data processing environment 100 by management interface 104. For example, security certificate 110 may be a security certificate that has been issued by a certificate authority that is not certificate authority 112. In this example, security certificate 110 may have been issued by another certificate authority other than certificate authority 112. As another example, security certificate 110 that has not been issued by certificate authority 112 may have been issued by an installation process associated with storage device 106. In particular, security certificate 110 may have been issued during an installation process of a second party, such as the manufacturer of storage device 106, while installing and configuring storage device 106 in data processing system 102.

In these illustrative examples, security certificate 118 may include information, such as reference to signer 120 and domain name 122. In these illustrative examples, security certificate from certificate authority 118 may also include information, such as reference to signer 124 and domain name 126. For example, reference to signer 120 may refer to manufacturer of storage device 106 or to a third party corporation, such as a corporation that provides services for storage device 106. As another example, reference to signer 124 may refer to certificate authority 112. In these illustrative examples, domain name 122 and domain name 126 identify network 128 where data processing system 102 is located.

As depicted, security certificate management module 130 and customer support program module 132 are present in data processing system 102 for generating, retrieving, and processing data in data processing system 102, in the processes described herein, for managing security certificates 114 in a data processing environment 100. In these illustrative examples, subsequent to data processing system 102 identifying that a use of management interface 104 is not associated with a security certificate issued by certificate authority 118, security certificate management module 130 may determine if customer support program module 132 exists in data process system 102 and comprises service for sending information about critical events 134. For example, customer support program module 132 may be a customer support service for data processing system 102 that was configured for use prior to the installation of storage device 106. In this example, service for sending information about critical events 134 may be a service configured in customer support program module 132 for sending and retrieving data and requests to an entity supporting data processing system 102. In these illustrative examples, user interface 136 is an interface used by users of data processing system 102 for requesting help with issues associated with data processing system 102.

In these illustrative examples, subsequent to security certificate management module 130 determining that customer support program module 132 exists in data process system 102 and comprises service for sending information about critical events 134, security certificate management module 130 may generate a certificate signing request, such as certificate signing request 140. As depicted, data processing system 102 comprises information 138 for use in generating and sending certificate signing request 140. In these illustrative examples, information 138 for use in generating and sending certificate signing request 140 may comprise a domain name for network 128, a legal name for the owner of data processing system 102, a physical address where data processing system 102 is located, contact information for the owner of data processing system 102, a destination for sending certificate signing requests, and a protocol for sending certificate signing requests. Thus, security management module 130 may use information 138 to generate certificate signing request 140. As depicted, security management module 130 may use service for sending information about critical events 134 to send certificate signing request 140 to the destination for sending certificate signing requests defined in information 138 using the protocol for sending certificate signing requests defined in information 138.

As depicted, user 142 of client 144 may use management interface 104 for storage device, and user interface 136 of customer support program module 132 for managing security certificates 114. For example, responsive to user 142 receiving an email comprising a response to certificate signing request 140 that includes security certificate from certificate authority 118, user 142 may select an option to configure reference to security certificate 110 to point to security certificate from certificate authority 118.

The illustration of data processing environment 100 in FIG. 1 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these functional components may be combined, divided, or combined and divided into different blocks when implementing an illustrative embodiment.

For example data processing system 102 may be a local area network (LAN), a wide area network (WAN), an intranet, the Internet, or some combination thereof As another illustrative example, certificate authority 112 may be located on another computer other than data processing system 102, such as a remote server connected to data processing system 102 through network 128. In this example, the server may be located in a customer support center, third party certificate authority, and any other suitable location for a certificate authority.

Figure 2:
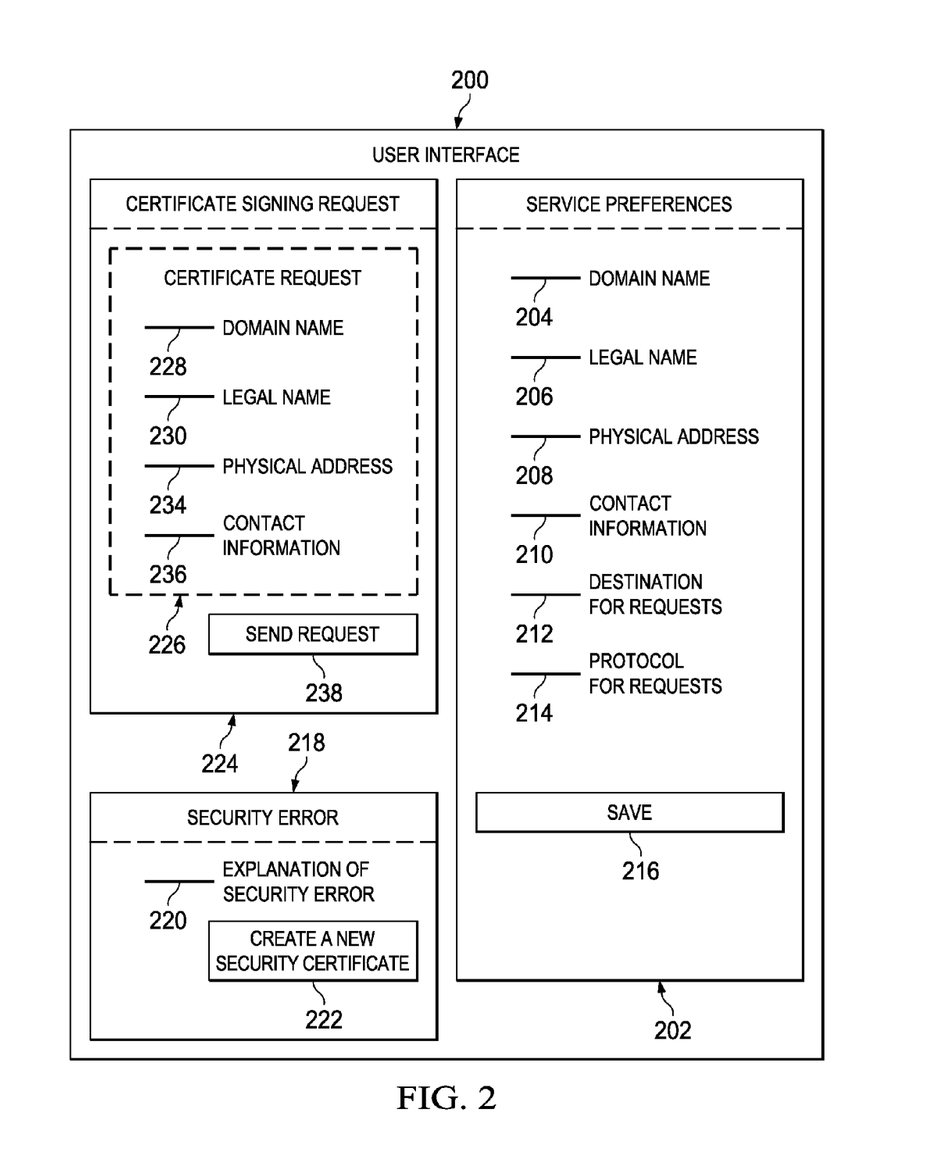
FIG. 2 is an illustration of a user interface for managing security certificates in a data processing environment in accordance with an illustrative embodiment.

Turning next to FIG. 2, an illustrative example of a process for determining service deployment readiness is depicted in accordance with an illustrative embodiment. The steps in FIG. 2 may be implemented in service deployment readiness evaluation environment 100 in FIG. 1. In particular, the steps may be implemented in software, hardware, or a combination of the two using analytics module 140, planning module 142, and questionnaire response processing module 140 in data processing system 102 in FIG. 1.

With reference now to FIG. 2, an illustration of a user interface for managing security certificates in a data processing environment is depicted in accordance with an illustrative embodiment. User interface 200 is an illustrative example of one implementation of a graphical user interface for data processing environment 100 in FIG. 1 in data processing system 102 in FIG. 1. In other illustrative examples, user interface 200 may also be any type of user interface suitable for presenting the contents of user interface 200 to one or more users.

In this illustrative example, user interface 200 includes user interface windows of security certificate management module 130 in FIG. 1 and customer support program module 132 in FIG. 1. Service preferences 202 is a window present in user interface 200 for entering and modifying preferences, such as information 138 in FIG. 1. In this illustrative example, service preferences 202 is a user interface for customer support program module 132 in FIG. 1. As depicted, the information in window for service preferences 202 includes domain name 204, legal name 206, physical address 208, contact information 210, destination for requests 212, and protocol for requests 214. As depicted, save 216 is a button present in service preferences 202 for saving the information entered or modified in service preferences 202.

As depicted, security error 218 is a window present in user interface 200. In this illustrative example, security error is an example of an error message displayed by data processing system 102 in FIG. 1. For example, responsive to a use of management interface 104 in FIG. 1, data processing system 102 may begin a process to determine if management interface 104 is associated with a trusted certificate authority, such as certificate authority 112 in FIG. 1. In this example, responsive to determining that management interface 104 is not associated with trusted certificate authority 112, security error 218 is displayed in user interface 200. As depicted, security error 218 includes explanation of security error 220. As also depicted, create a new security certificate 222 is a button present in security error 218 for beginning a process to create a new security certificate.

Certificate signing request 224 is a window present in user interface 200 for obtaining a security certificate, such as security certificate 116 in FIG. 1 that is signed by a certificate authority, such as certificate authority 112. In this illustrative example, certificate request 226 is a portion of certificate signing request 224 for displaying and modifying information required in the process for obtaining a security certificate signed by certificate authority 112. As depicted, certificate request 226 includes domain name 228, legal name 230, physical address 234, and contact information 236. As also depicted, send request 238 is a button present in certificate signing request 224 for creating and sending a request, such as certificate signing request 140 in FIG. 1, to obtain a security certificate signed by certificate authority 112.

Figure 3:
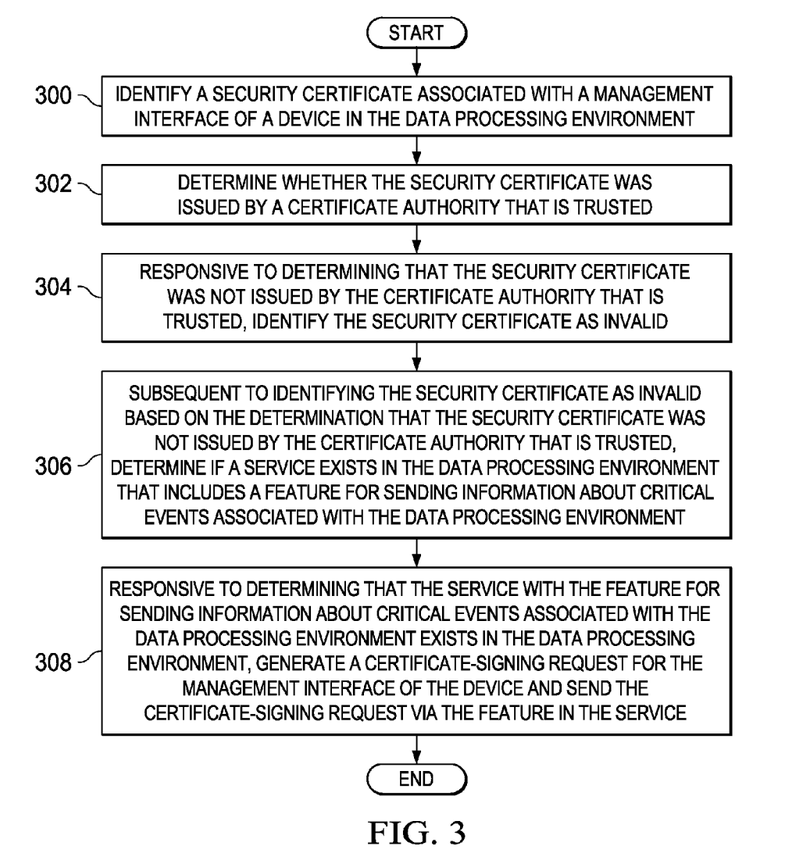
FIG. 3 is a flow chart of a process for managing security certificates in a data processing environment in accordance with an illustrative embodiment.

With reference now to FIG. 3, an illustrative example of a flowchart of a process for managing security certificates is depicted in accordance with an illustrative embodiment. The steps in FIG. 3 may be implemented in data processing environment 100 in FIG. 1. In particular, the steps may be implemented in software, hardware, or a combination of the two using security certificate management module 130 and customer support program module 132 in data processing system 102 in FIG. 1.

The process begins by identifying a security certificate associated with a management interface of a device in the data processing environment (step 300). For example, data processing system 102 in FIG. 1 may identify security certificate 116 in FIG. 1 as associated with management interface 104 in FIG. 1 of storage device 106 in FIG. 1 in data processing environment 100 using reference to security certificate 110 in FIG. 1. The process then determines whether the security certificate was issued by a certificate authority that is trusted (step 302). For example, the process may determine if security certificate 110 was issued by certificate authority 112.

Responsive to determining that the security certificate was not issued by the certificate authority that is trusted, the process identifies the security certificate as invalid (step 304). Subsequent to identifying the security certificate as invalid based on the determination that the security certificate was not issued by the certificate authority that is trusted, the process determines if a service exists in the data processing environment that includes a feature for sending information about critical events associated with the data processing environment (step 306).

Then, responsive to determining that the service with the feature for sending information about critical events associated with the data processing environment exists in the data processing environment, the process generates a certificate-signing request for the management interface of the device and sends the certificate-signing request via the feature in the service (step 308) with the process terminating thereafter.

Figure 4:
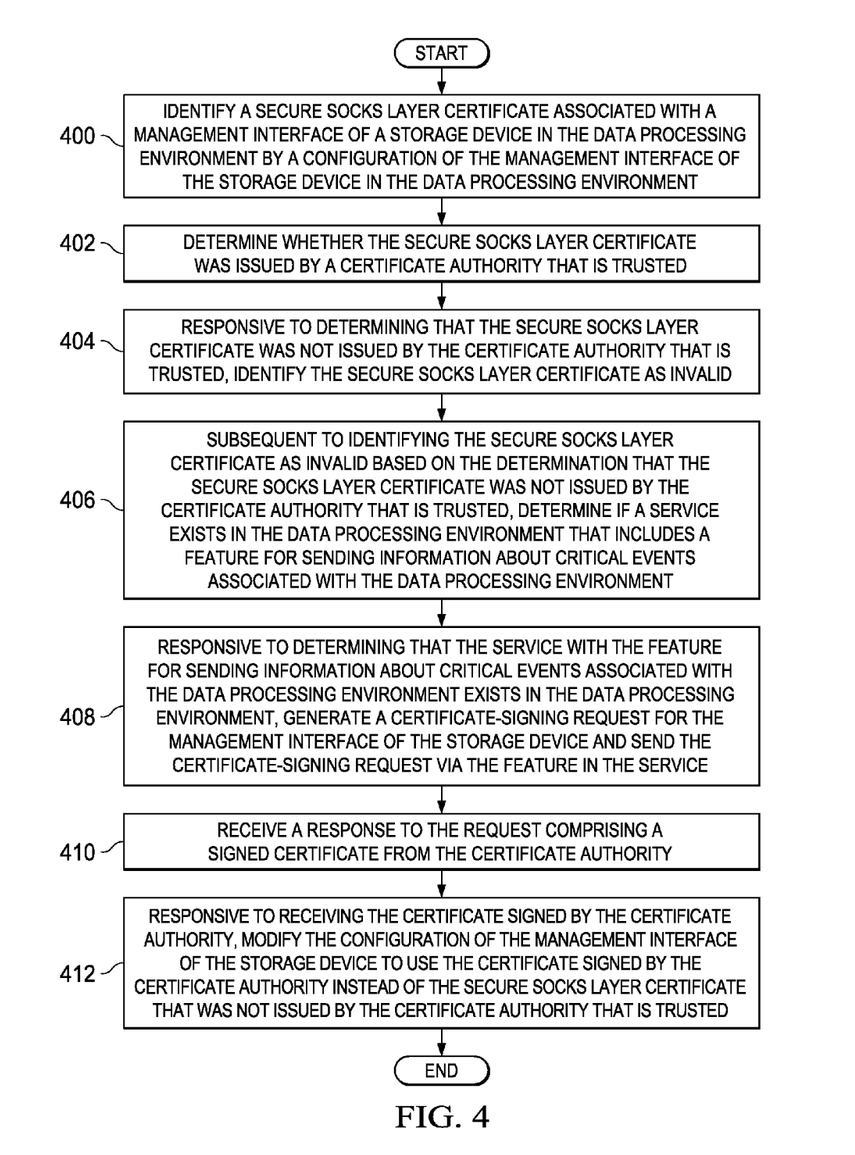
FIG. 4 is a flow chart of a process for managing security certificates in a data processing environment in accordance with an illustrative embodiment.

With reference now to FIG. 4, an illustrative example of a flowchart of a process for managing security certificates is depicted in accordance with an illustrative embodiment. The steps in FIG. 4 may be implemented in data processing environment 100 in FIG. 1. In particular, the steps may be implemented in software, hardware, or a combination of the two using security certificate management module 130 and customer support program module 132 in data processing system 102 in FIG. 1.

The process begins by identifying a secure socks layer certificate associated with a management interface of a storage device in the data processing environment by a configuration of the management interface of the storage device in the data processing environment (step 400). The process then determines whether the secure socks layer certificate was issued by a certificate authority that is trusted (step 402). Responsive to determining that the secure socks layer certificate was not issued by the certificate authority that is trusted, the process identifies the secure socks layer certificate as invalid (step 404).

Subsequent to identifying the secure socks layer certificate as invalid based on the determination that the secure socks layer certificate was not issued by the certificate authority that is trusted, the process determines if a service exists in the data processing environment that includes a feature for sending information about critical events associated with the data processing environment (step 406). Responsive to determining that the service with the feature for sending information about critical events associated with the data processing environment exists in the data processing environment, the process then generates a certificate-signing request for the management interface of the storage device and sends the certificate-signing request via the feature in the service (step 408).

Next, the process receives a response to the request comprising a signed certificate from the certificate authority (step 410). Responsive to receiving the certificate signed by the certificate authority, the process modifies the configuration of the management interface of the storage device to use the certificate signed by the certificate authority instead of the secure socks layer certificate that was not issued by the certificate authority that is trusted (step 412) with the process terminating thereafter.

Figure 5:
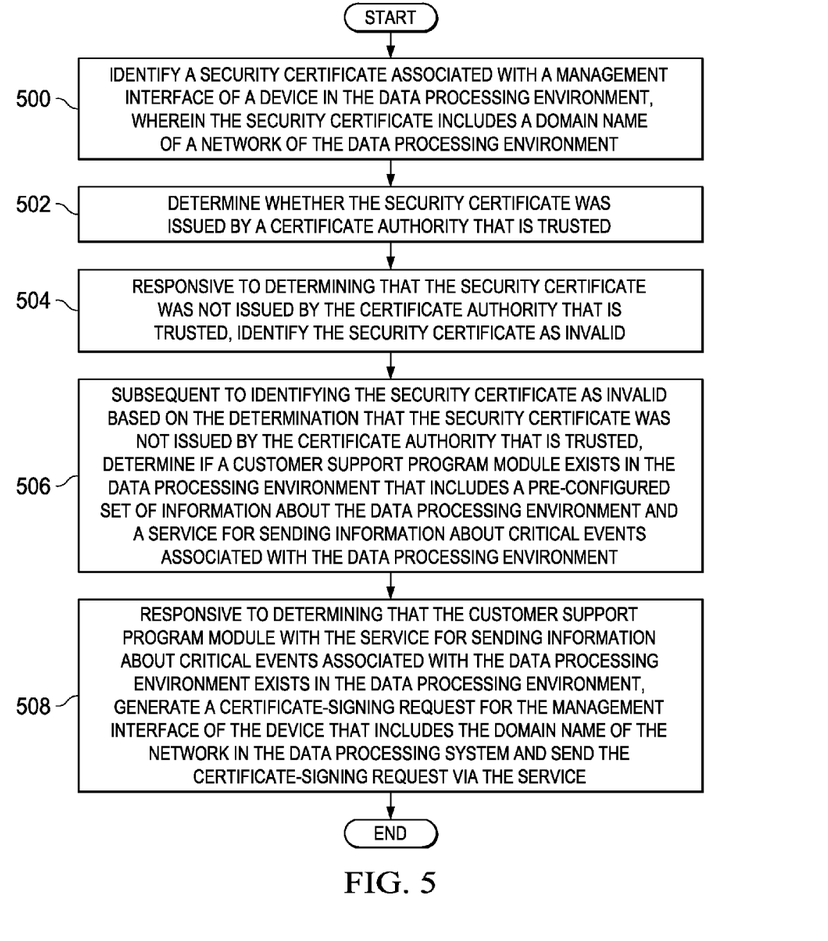
FIG. 5 is a flow chart of a process for managing security certificates in a data processing environment in accordance with an illustrative embodiment.

With reference now to FIG. 5, an illustrative example of a flowchart of a process for managing security certificates is depicted in accordance with an illustrative embodiment. The steps in FIG. 5 may be implemented in data processing environment 100 in FIG. 1. In particular, the steps may be implemented in software, hardware, or a combination of the two using security certificate management module 130 and customer support program module 132 in data processing system 102 in FIG. 1.

The process begins by identifying a security certificate associated with a management interface of a device in the data processing environment, wherein the security certificate includes a domain name of a network of the data processing environment (step 500). The process then determines whether the security certificate was issued by a certificate authority that is trusted (step 502). Responsive to determining that the security certificate was not issued by the certificate authority that is trusted, the process identifies the security certificate as invalid (step 504).

Subsequent to identifying the security certificate as invalid based on the determination that the security certificate was not issued by the certificate authority that is trusted, the process determines if a customer support program module exists in the data processing environment that includes a pre-configured set of information about the data processing environment and a service for sending information about critical events associated with the data processing environment (step 506). Responsive to determining that the customer support program module with the service for sending information about critical events associated with the data processing environment exists in the data processing environment, the process then generates a certificate-signing request for the management interface of the device that includes the domain name of the network in the data processing system and sends the certificate-signing request via the service (step 508) with the process terminating thereafter.

Figure 6:
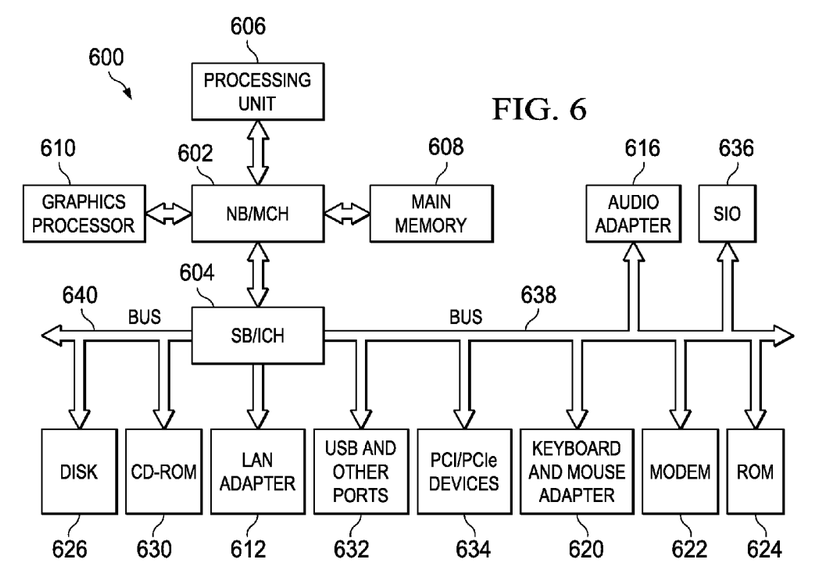
FIG. 6 is an illustration of a data processing system in accordance with an illustrative embodiment.

Referring to FIG. 6, a block diagram of a computer or data processing system is shown in which aspects of the present invention may be implemented. This system is an example of a computer which may be used to implement components of FIG. 1, such as security certificate management module 130, customer support program module 132, data processing system 102, management interface 104, storage device 106, certificate authority 112, and network 128, and in which computer usable code or instructions implementing the processes for embodiments of the present invention may be located.

In the depicted example, the data processing system of FIG. 6 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, disk 626, CD-ROM 630, universal serial bus (USB) ports and other communication ports 632, and PCI/PCIe devices 634 connect to SB/ICH 604 through bus 638 and bus 640. PCI/PCIe devices 634 may include, for example, Ethernet adapters, add-in cards, and PC cards for notebook computers. PCI uses a card bus controller, while PCIe does not. ROM 624 may be, for example, a flash binary input/output system (BIOS).

Disk 626 and CD-ROM 630 connect to SB/ICH 604 through bus 640. Disk 626 and CD-ROM 630 may use, for example, an integrated drive electronics (IDE) or serial advanced technology attachment (SATA) interface. Super I/O (SIO) device 636 may be connected to SB/ICH 604.

An operating system runs on processing unit 606 and coordinates and provides control of various components within the data processing system of FIG. 6. As a client, the operating system may be a commercially available operating system such as Microsoft® Windows® (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on the data processing system (Java is a trademark of Sun Microsystems, Inc. in the United States, other countries, or both).

As a server, the data processing system of FIG. 6 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). The data processing system may be a symmetric multiprocessor (SMP) system including a plurality of processors in processing unit 606. Alternatively, a single processor system may be employed.

Instructions for the operating system, the object-oriented programming system, and applications or programs are located on storage devices, such as disk 626, and may be loaded into main memory 608 for execution by processing unit 606. The processes for embodiments of the present invention are performed by processing unit 606 using computer usable program code, which may be located in a memory such as, for example, main memory 608, ROM 624, or in one or more peripheral devices, such as, for example, disk 626 and CD-ROM 630.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Thus, illustrative embodiments of the present invention provide a computer implemented method, data processing system, and computer program product for managing security certificates in a data processing environment.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing security certificates in a data processing environment, the method comprising:

identifying, by a computer, a security certificate associated with a management interface of a device in the data processing environment, wherein the security certificate associated with the management interface of the device is associated with the device by a configuration of the management interface of the device in the data processing environment;

determining, by the computer, whether the security certificate was issued by a certificate authority that is trusted;

responsive to determining that the security certificate was not issued by the certificate authority that is trusted, identifying, by the computer, the security certificate as invalid;

subsequent to identifying the security certificate as invalid based on the determination that the security certificate was not issued by the certificate authority that is trusted, determining, by the computer, if a service exists in the data processing environment that includes a feature for sending information about critical events associated with the data processing environment, including the security certificate was not issued by the certificate authority that is trusted, to a predetermined destination selected from a set of destinations including a first party including an entity supporting data processing system, a second party including a manufacturer of the device, and a third party including a corporation that provides services for the device;

responsive to determining that the service with the feature for sending information about the critical events associated with the data processing environment exists in the data processing environment, generating, by the computer, a certificate-signing request for the management interface of the device and sending the certificate-signing request via the feature in the service to the predetermined destination selected; and responsive to receiving a certificate signed from the predetermined destination selected, referencing the signed certificate and modifying, by the computer, the configuration of the management interface of the device to use the certificate signed by the certificate authority instead of the security certificate that was not issued by the certificate authority that is trusted.

2. The method of claim 1, further comprising:

subsequent to sending the request for certificate-signing, receiving, by the computer, a response to the request comprising a signed certificate from the certificate authority.

3. The method of claim 2 wherein modifying the configuration of the management interface of the device to use the certificate signed by the certificate authority is further responsive to receiving, by the computer, a notification that a user has selected a link provided in the received response, and wherein modifying, by the computer, the configuration of the management interface of the device to use the certificate signed by the certificate authority further comprises:

executing, by the computer, a sequence of program instructions which replace the security certificate of the device in the configuration of the management interface of the device with the certificate signed by the certificate authority.

4. The method of claim 1, wherein sending, by the computer, the request for certificate-signing is further responsive to receiving, by the computer, a notification that a user has requested generation of a security certificate signed by the certificate authority that is trusted.

5. The method of claim 1, wherein the security certificate includes a domain name of a network of the data processing environment and the generated certificate-signing request for the management interface of the device includes the domain name of the network in the data processing system.

6. The method of claim 5, wherein the domain name of the network of the data processing environment is determined, by the computer, from one of an internet protocol address of the network and an identification of the domain name by the user.

7. The method of claim 1, wherein the service in the data processing environment that includes the feature for sending, by the computer, information about the critical events associated with the data processing environment is provided by a customer support program module that includes a pre-configured set of information about the data processing environment at least comprising a domain name of the data processing environment, a destination where requests are sent, a selection of a protocol to use when sending requests, a name identifying a legal entity that owns the data processing environment, a physical address of the location where the data processing environment is located, and contact information for an administrator of the data processing environment.

8. The method of claim 7, wherein the generated certificate-signing request for the management interface of the device further includes, the name identifying the legal entity that owns the data processing environment, the physical address of the location where the data processing environment is located, and the contact information for the administrator of the data processing environment.

9. The method of claim 1, wherein the security certificate is generated and signed by another service associated with installation of the management interface of the device in the data processing environment, wherein the another service is not the certificate authority that is trusted.

10. The method of claim 1, wherein determining, by the computer, if the security certificate was issued by the certificate authority that is trusted further comprises:

parsing, by the computer, the security certificate to identify a signer of the security certificate; and comparing, by the computer, the signer of the security certificate to the certificate authority that is trusted.

11. The method of claim 1, wherein the feature in the service for sending, by the computer, information about the critical events associated with the data processing environment is further configured to send and receive information through a network firewall of the network of the data processing environment using a protocol configured to pass the information through the network firewall.

12. The method of claim 1, wherein the device is a storage device.

13. The method of claim 1, wherein the security certificate is a secure socks layer certificate.

14. A data processing system for managing security certificates in a data processing environment, the data processing system comprising:

a processor unit, a memory, and a computer readable storage device;

first program code to identify a security certificate associated with a management interface of a device in the data processing environment, wherein the security certificate associated with the management interface of the device is associated with the device by a configuration of the management interface of the device in the data processing environment;

second program code to determine if the security certificate was issued by a certificate authority that is trusted;

third program code to identify the security certificate as invalid responsive to determining that the security certificate was not issued by the certificate authority that is trusted;

fourth program code to determine if a second service exists in the data processing environment that includes a feature for sending information about critical events associated with the data processing environment including the security certificate was not issued by the certificate authority that is trusted to a predetermined destination selected from a set of destinations including a first party including an entity supporting data processing system, a second party including a manufacturer of the device, and a third party including a corporation that provides services for the device subsequent to the third program code identifying the security certificate as invalid based on the determination that the security certificate was not issued by the certificate authority that is trusted; and fifth program code to generate a certificate-signing request for the management interface of the device and send the certificate-signing request via the feature in the second service responsive to a determination that the second service with the feature for sending information about the critical events associated with the data processing environment exists in the data processing environment to the predetermined destination selected and responsive to receiving a certificate signed from the predetermined destination selected, referencing the signed certificate and seventh program code for modifying, by the computer, the configuration of the management interface of the device to use the certificate signed by the certificate authority instead of the security certificate that was not issued by the certificate authority that is trusted, wherein the first program code, the second program code, the third program code, the fourth program code, and fifth program code are stored in the computer readable storage device for execution by the processor unit via the memory.

15. The data processing system of claim 14, further comprising:
sixth program code to receive a response to the request comprising a signed certificate from the certificate authority, wherein the sixth program code is stored in the computer readable storage device for execution by the processor unit via the memory.

16. The data processing system of claim 14, wherein the seventh program code to modify the configuration of the management interface of the device to use the certificate signed by the certificate authority is further responsive to receiving a notification that a user has selected a link provided in the received response, and wherein the seventh program code to modify the configuration of the management interface of the device to use the certificate signed by the certificate authority further comprises:
program code to execute a sequence of program instructions which replace the security certificate of the device in the configuration of the management interface of the device with the certificate signed by the certificate authority.

17. The data processing system of claim 14, wherein the device is a storage device, the security certificate is a secure socks layer certificate, the service in the data processing environment that includes the feature for sending information about the critical events associated with the data processing environment is provided by a customer support program module that includes a pre-configured set of information about the data processing environment at least comprising a domain name of the data processing environment, a destination where requests are sent, a selection of a protocol to use when sending requests, a name identifying a legal entity that owns the data processing environment, a physical address of the location where the data processing environment is located, and contact information for an administrator of the data processing environment, and the generated certificate-signing request for the management interface of the device further includes, the name identifying the legal entity that owns the data processing environment, the physical address of the location where the data processing environment is located, and the contact information for the administrator of the data processing environment.

18. A computer program product for managing security certificates in a data processing environment, the computer program product comprising:
a computer readable storage device;
program code, stored on the computer readable storage device, for identifying a security certificate associated with a management interface of a device in a data processing environment wherein the security certificate associated with the management interface of the device is associated with the device by a configuration of the management interface of the device in the data processing environment;
program code, stored on the computer readable storage device, for determining if the security certificate was issued by a certificate authority that is trusted;
program code, stored on the computer readable storage device, responsive to determining that the security certificate was not issued by the certificate authority that is trusted, for identifying the security certificate as invalid;
program code, stored on the computer readable storage device, for determining if a second service exists in the data processing environment that includes a feature for sending information about critical events associated with the data processing environment, including the security certificate was not issued by the certificate authority that is trusted, to a predetermined destination selected from a set of destinations including a first party including an entity supporting data processing system, a second party including a manufacturer of the device, and a third party including a corporation that provides services for the device subsequent to identifying the security certificate as invalid based on the determination that the security certificate was not issued by the certificate authority that is trusted; and
program code, stored on the computer readable storage device, responsive to a determination that the second service with the feature for sending information about the critical events associated with the data processing environment exists in the data processing environment, for generating a certificate-signing request for the management interface of the device and sending the certificate-signing request via the feature in the second service to the predetermined destination selected; and
program code, stored on the computer readable storage device, responsive to receiving a certificate signed from the predetermined destination selected, for referencing the signed certificate and modifying, by the computer, the configuration of the management interface of the device to use the certificate signed by the certificate authority instead of the security certificate that was not issued by the certificate authority that is trusted.

* * * * *